(12) United States Patent
Jimenez et al.

(10) Patent No.: US 11,270,597 B2
(45) Date of Patent: Mar. 8, 2022

(54) SIMULATED REALITY TECHNOLOGIES FOR ENHANCED MEDICAL PROTOCOL TRAINING

(71) Applicant: CodeScribe LLC, San Jose, CA (US)

(72) Inventors: Ronald W. Jimenez, San Jose, CA (US); Che-Chuen Ho, Santa Clara, CA (US); William Conrad Altmann, Austin, TX (US)

(73) Assignee: CodeScribe LLC, San Jose, CA (US)

( * ) Notice: Subject to any disclaimer, the term of this patent is extended or adjusted under 35 U.S.C. 154(b) by 486 days.

(21) Appl. No.: 16/382,753

(22) Filed: Apr. 12, 2019

(65) Prior Publication Data
US 2019/0340943 A1    Nov. 7, 2019

Related U.S. Application Data

(60) Provisional application No. 62/665,413, filed on May 1, 2018.

(51) Int. Cl.
*G09B 5/02* (2006.01)
*G06F 3/01* (2006.01)
*G09B 23/30* (2006.01)

(52) U.S. Cl.
CPC .............. *G09B 5/02* (2013.01); *G06F 3/012* (2013.01); *G06F 3/014* (2013.01); *G09B 23/30* (2013.01)

(58) Field of Classification Search
CPC ........... G09B 5/02; G09B 23/30; G06F 3/012; G06F 3/014
See application file for complete search history.

(56) References Cited

U.S. PATENT DOCUMENTS

| | | | |
|---|---|---|---|
| 10,198,967 B1 * | 2/2019 | Agrawal | G09B 23/288 |
| 10,895,906 B2 * | 1/2021 | West | G06F 3/012 |
| 11,043,137 B2 * | 6/2021 | Sweet | G09B 23/30 |
| 2007/0111174 A1 | 5/2007 | Kozmenko et al. | |
| 2008/0076100 A1 | 3/2008 | Hendrickson et al. | |
| 2008/0138778 A1 * | 6/2008 | Eggert | G16Z 99/00 434/262 |

(Continued)

OTHER PUBLICATIONS

International Search Report dated Jul. 10, 2019 for PCT Application No. PCT/US2019/030217; 10 pages., Jul. 10, 2019, 10 pages.

(Continued)

*Primary Examiner* — David E Choi
(74) *Attorney, Agent, or Firm* — Perkins Coie LLP

(57) ABSTRACT

Introduced here are teaching system for realistically simulating medical situations in such a manner to test individuals as to the adequacy of their learning. A teaching system may include a manikin representative of a patient, an image projection mechanism, a simulation mechanism, a headpiece, a pair of hand coverings, a controller, a performance review mechanism, a recording device, a scenario generation mechanism, or any combination thereof. The teaching system can improve upon conventional simulation in several respects. First, the script corresponding to a simulation session may be dynamically traversed to mimic the unpredictability of an actual medical situation. Second, the action(s) of an individual may be actively monitored to discover whether her behavior complied with the relevant protocol(s).

23 Claims, 9 Drawing Sheets

(56) References Cited

U.S. PATENT DOCUMENTS

| | | | |
|---|---|---|---|
| 2008/0138779 A1* | 6/2008 | Eggert | G16H 50/50 434/266 |
| 2009/0263775 A1 | 10/2009 | Ullrich | |
| 2012/0052470 A1* | 3/2012 | Woerlee | G09B 23/288 434/265 |
| 2012/0282583 A1 | 11/2012 | Thaler et al. | |
| 2014/0127663 A1* | 5/2014 | Eggert | G09B 23/32 434/271 |
| 2014/0198130 A1 | 7/2014 | Lacroix | |
| 2015/0379882 A1* | 12/2015 | Gait | G09B 19/003 434/267 |
| 2017/0105614 A1* | 4/2017 | McWilliam | A61M 16/0488 |
| 2018/0158376 A1* | 6/2018 | Tessier | A61B 5/107 |
| 2020/0202746 A1* | 6/2020 | Olsson | A61B 34/76 |

OTHER PUBLICATIONS

"Cyberglove Systems: CyberGrasp System User Guide v2.0, rev E", [Retrieved on Jun. 25, 2019]. Retrieved from the Internet. <https://static1.squarespace.com/static/559c381ee4b0ff7423b6b6a4/t/574f4d2a859fd0c5142088db/1464814893851/CyberGrasp_UserGuide_2009_1.pdf>., Dec. 2007, entire document.

* cited by examiner

800

801
Receive input indicative of a selection of a medical situation

802
Identify a simulation session corresponding to the medical situation

803
Facilitate the simulation session

804
Review data indicative of the action(s) of an active participant during the simulation session 805
Generate a report that specifies whether the active participant acted in accordance with the appropriate medical protocol(s)

FIGURE 8

SIMULATED REALITY TECHNOLOGIES FOR ENHANCED MEDICAL PROTOCOL TRAINING

CROSS-REFERENCE TO RELATED APPLICATIONS

This application claims priority to U.S. Provisional Application No. 62/665,413, titled "Simulated Reality System and Method for Medical Emergency Protocol Training" and filed on May 1, 2018, which is incorporated by reference herein in its entirety.

TECHNICAL FIELD

Various embodiments concern technologies for simulating medical situations in a realistic manner to train individuals in accordance with established protocols.

BACKGROUND

Medical simulation (or simply "simulation") refers to the methodology for training medical professionals (e.g., physicians, nurses, researchers, and technicians) through the use of advanced educational technology. Generally, simulation puts medical professionals through a variety of different learning exercises that are intended to mimic the scenarios these medical professionals may experience throughout their careers.

Simulations can be held in a classroom, in situ, or a space designed specifically for simulation. For example, during a simulation session, one or more medical professionals may enter a space representative of a healthcare setting (e.g., an examination room, emergency room, or operating room) that includes a high-fidelity manikin representative of a patient. The manikin may be referred to as a "patient simulator," "medical simulator," "nursing simulator," or "surgery simulator."

Simulation sessions are often recorded and then streamed in real time to another medical professional (also referred to as an "educator") for review. The educator may provide feedback, alter the course of a simulation session, etc. Recorded content may also be stored for future playback during a debriefing process. In most instances, the educator provides the voice of the manikin and guides technical control of the manikin throughout the simulation session. However, in some instances, a technician may be responsible for managing the manikin (e.g., under the guidance/supervision of the educator).

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 8 depicts a flow diagram of a process for monitoring whether an active participant in a simulation session has acted in accordance with the appropriate medical protocol(s).

Figure 1:
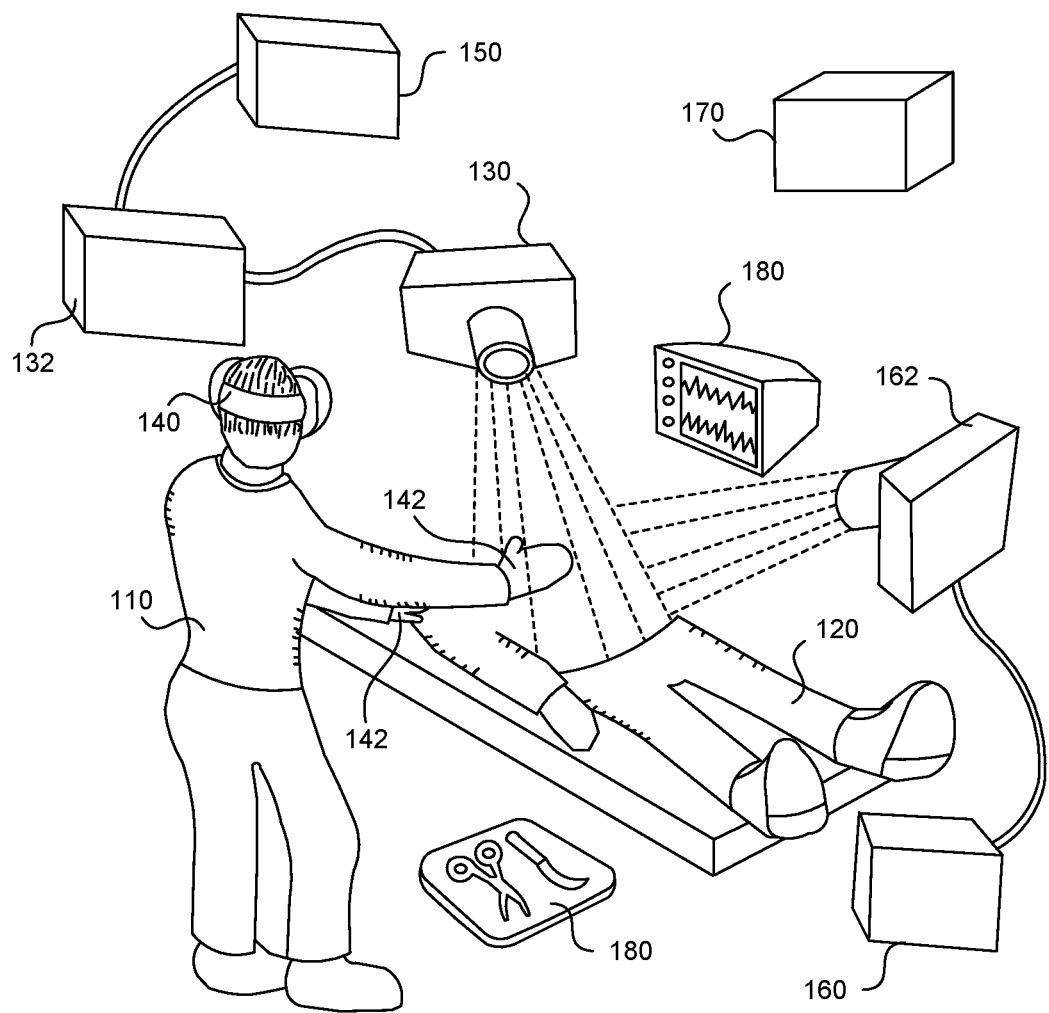
FIG. 1 depicts an example of a system designed to improve the realism of scenarios experienced by a learner through simulation.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

In the past, simulation has allowed medical professionals to experience a wide variety of staged scenarios before encountering these situations in the real world. While research has shown that simulation is often associated with improved patient outcomes, simulation suffers from several drawbacks. For example, each simulation session is designed to train medical professional(s) based on a scripted scenario. However, because the scenario is entirely scripted, it can be limited in its effectiveness, especially when compared to on-the-job training and live emergency situations.

Introduced here, therefore, are technologies for realistically simulating medical situations in such a manner to test medical professionals as to the adequacy of their learning. The effectiveness of conventional simulation is limited in at least two respects. First, conventional simulation requires that a medical professional (also referred to as a "learner") involved in a simulation session provide either written feedback or verbal feedback. Second, conventional simulation requires that the learner, who is often inexperienced, describe the proper response(s) using appropriate terminology, abbreviations, etc. The technology described herein can address these issues, thereby improving various aspects of simulation.

Moreover, the technology may be designed so that it can be readily repurposed for different protocols, different specialties, etc. For instance, in the area of cardiopulmonary resuscitation (CPR), the relevant protocols (also referred to as "standards") provide direction on the proper conduct should a CPR-related event occur. Rather than test a learner against a generalized rubric, the learner may instead be tested based on these protocols. Examples of such protocols include Advanced Cardiac Life Support (ACLS), Adult Advanced Cardiovascular Life Support (AACLS), Pediatric Advanced Life Support (PALS) from the American Heart Association, and Advanced Trauma Life Support (ATLS) from the American College of Surgeons.

Embodiments may be described with reference to particular electronic devices, networks, protocols, emergencies, etc. However, those skilled in the art will recognize that the features are equally applicable to other electronic devices, networks, protocols, emergencies, etc.

The technology may be embodied using special-purpose hardware (e.g., circuitry), programmable circuitry appropriately programmed with software and/or firmware, or a combination of special-purpose hardware and programmable circuitry.

Terminology

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, and/or firmware components. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Technology Overview

FIG. 1 depicts an example of a system 100 designed to improve the realism of scenarios experienced by a learner 110 through simulation. Here, the system 100 includes a manikin 120, an image projection mechanism 130, a simulation mechanism 132, a headpiece 140, one or more hand coverings 142, a controller 150, a performance review mechanism 160, a recording device 162, a scenario generation mechanism 170, and various pieces of medical equipment 180. Together, the image projection mechanism 130, the simulation mechanism 132, the headpiece 140, the hand covering(s) 142, and the piece(s) of medical equipment 180 comprise the peripherals of the system 100. The image projection mechanism 130 may be a digital projector, a laser projector, or the like. In some embodiments, the simulation mechanism 132 and/or the controller 150 are embodied as software that resides on a computing device, such as a computer server, a laptop computer, a tablet computer, a smart phone, and the like. In other embodiments, the simulation mechanism 132 and/or the controller 150 are embodied as hardware. For example, the controller 150 may be embodied as a processor (or a collection of processors) responsible for managing other components of the system 100. The headpiece 140 may be a heads-up display, smart eyewear such as Google Glass, or smart goggles such as Oculus Rift. The hand coverings 142 may be fingered gloves covering the entire hand, fingerless gloves leaving the fingertips free, wristwatch type of devices, and the like. The performance review mechanism 160 may be a software-driven scoring system or a software-implemented series of one or more forms to be manually completed by medical professionals. The scoring software and forms may be stored on a computing device, such as a computer server or a laptop computer, that is accessible to the system 100. The scenario generation mechanism 170 may also be embodied as software that resides on a computing device. Accordingly, in some embodiments, the software-implemented components (e.g., the simulation mechanism 132, controller 150, performance review mechanism 160, and/or scenario generation mechanism 170) may reside on the same computing device. Medical equipment 180 may be real (i.e., operable) devices, such as a cardiopulmonary monitor, an electrocardiogram (EKG or ECG) machine, a defibrillator, and the like, or emulations of such devices, as prescribed by the standard protocol or protocols being simulated. Thus, the medical equipment 180 may include imitations of real devices, though these imitations may still include various sensors, such as accelerometers, depth sensors, temperature sensors, etc. Those skilled in the art will recognize that embodiments of the system 100 may include some or all of the components shown in FIG. 1, as well as other components not shown here. For example, some embodiments of the system 100 may not be able to actively monitor the hand covering(s) 142 worn by the learner. In such embodiments, the system 100 could instead examine content generated by the recording device 162 to determine what actions, if any, the learner 110 has performed with the left hand and/or the right hand.

In some embodiments, the system 100 is designed for a learner 110, who is an active participant in a simulation session. Actions performed by the learner 110 during the simulation session may be monitored, measured, etc. For instance, the system 100 may be configured to generate a log of learner actions which can be subsequently analyzed to determine whether the learner 110 took the appropriate action(s) throughout the simulation session. In other embodiments, the system 100 is designed for multiple learners. For example, a simulation session that emulates an emergency in an operating room may be designed for multiple learners, each of whom is responsible for different tasks (e.g., surgery, anesthesia, etc.). In such embodiments, the system 100 may include multiple headpieces, multiple pairs of hand coverings, etc.

To immerse the learner 110 in a simulation session, the system 100 may facilitate an interactive, computer-generated experience that takes place within a simulated environment. The interactive, computer-generated experience may involve virtual reality features, augmented reality features, or any combination thereof. For instance, the image projection mechanism 130 may generate visual features proximate to the manikin 120. These visual features may simulate various medical conditions/events, wounds, discolorations, etc. Generally, the image projection mechanism 130 is an optical device that projects an image (or moving images) onto a surface. Here, for example, the image projection mechanism 130 is designed to project a visual pattern onto the surface of the manikin 120.

Additionally or alternatively, the headpiece 140 (also referred to as a "head-mounted display" or a "head-mounted device") may be employed to create digital features to facilitate the interactive, computer-generated experience. These digital features may be augmented reality features or virtual reality features. Thus, the headpiece 140 may display virtual reality feature(s) representative of a scenario (e.g., a medical emergency) from the point of view of the learner 110. Alternatively, the headpiece 140 may display augmented reality feature(s) representative of the scenario from the point of view of the learner 110. In such embodiments, the augmented reality feature(s) may interact with the manikin 120 and/or the visual features generated by the image projection mechanism 130. Consequently, in some embodiments, augmented reality features are generated by multiple sources (i.e., the image projection mechanism 130 and the headpiece 140), and these augmented reality features may interact with one another during the simulation session. In some embodiments the headpiece 140 includes a single display optic, while in other embodiments the headpiece 140 includes multiple display optics (e.g., one for each eye). The number of display optics may depend on the level of immersion desired by the learner 110 or required by the system 100. The desired level of immersion may also influence whether the headpiece 140 is worn as part of a helmet, visor, or pair of glasses.

During the simulation session, the hand covering(s) 142 can generate positional data that specifies the position of the hand(s) and/or finger(s) of the learner 110. The positional data can be generated in several different ways. In some embodiments, each hand covering 142 includes at least one inertial measurement unit (IMU). Data generated by an IMU may be used, for example, to determine the orientation of the hand. An IMU is an electronic component designed to measure the force, angular rate, inclination/tilt, and/or magnetic field of an object. Generally, an IMU includes accelerometer(s), gyroscope(s), magnetometer(s), or any combination thereof. In other embodiments, each hand covering 142 is monitored by another component of the system. For example, the image projection mechanism 130, the headpiece 140, or the recording device 162 may be configured to determine location/orientation of the hand covering(s) 142 based on the presence of a visual identifier (e.g., a visual mark along the exterior of each hand covering 142), an electronic identifier (e.g., a signal emitted by a source, such as a Bluetooth® chipset or a WiFi chipset), or any combination thereof.

In some embodiments, data can be sent to the piece(s) of medical equipment 180 to create a simulated medical situation involving the manikin 120. For example, information representative of the simulated medical situation, such as heart rate or respiration rate, may be shown on a display. As another example, information representative of the simulated medical situation may be conveyed via a digital stethoscope, digital blood pressure monitor, etc. Other examples of medical equipment 180 include electronic devices (e.g., heart rate and/or heart rhythm monitors, blood pressure monitors, blood glucose monitors) that are operated by the scenario generation mechanism 170 to simulate a medical issue experienced by the manikin 120, physical equipment (e.g., scalpels or clamps) that may be used by the learner 110 during the simulation session, etc. Similar to the hand covering(s) 142, the location of a piece of medical equipment 180 may be monitored by examining positional data generated by an IMU connected to the piece of medical equipment 180 or by monitoring a visual identifier, electronic identifier, etc.

In some embodiments, each piece of medical equipment 180 may be a normal, functional piece of medical equipment that captures biometrics from the manikin 120 or some other object, such as the heart beat sensed by the learner 110 through an ordinary, passive stethoscope from the surface of the manikin when the hand position is over the chest of the manikin or the heart rhythm discovered by the learner 110 by observing an EKG machine. The system 100 (and, more specifically, the scenario generation mechanism 170) may determine how to guide the learner 110 through a scripted scenario or an unscripted scenario based on the heart rhythm as indicated by the EKG machine.

In other embodiments, the medical equipment may be physically similar to a normal piece of medical equipment, but the medical equipment may create the biometrics internally rather than sensing a feature of the manikin. For example, a piece of medical equipment may be designed to generate a pulse that can be sensed by the learner 110 through the hand covering 142 when an IMU embedded within the hand covering 142 determines that the learner has placed the fingertips on the manikin to properly sense a pulse. Additionally or alternatively, the hand covering 142 may generate the sensation of a pulse through its internal actuators. In other embodiments, the medical equipment may be a non-functional device connected, via a wired channel or a wireless channel, to a display surface in the headpiece 140. For example, the headpiece 140 may present a real-time display of the manikin's blood pressure. In some embodiments, the manikin may be equipped with internal sensors which may detect touch by a learner 110 or a participant 710 or 720, such as a learner pressing against the throat to perform a tracheotomy as a part of the scenario. Additionally or alternatively, information regarding the health state of the manikin may be presented on a display (e.g., of a heart rhythm monitor such as an EKG machine).

By controlling the image projection mechanism 130, hand covering(s) 142, and/or piece(s) of medical equipment 180, the simulation generation mechanism 170 can generate a variety of different scenarios. In some embodiments, each scenario is scripted. Consequently, a state engine may be able to readily traverse the scripted scenario as the learner 110 performs the appropriate action(s), asks the appropriate question(s), etc. In other embodiments, each scenario is partially scripted. While partially scripted scenarios may be designed in a substantially similar manner as scripted scenarios, the state engine may be given the flexibility to alter a partially scripted scenario in real time (e.g., as the learner 110 completes the simulation session). For example, the state engine may dynamically choose between different paths of a multi-path script based on the behavior of the learner 110. Thus, the simulation generation mechanism 170 may include one or more processors, a state engine, and a memory that includes scripts corresponding to different scenarios and instructions for traversing the scripts.

Figure 2:
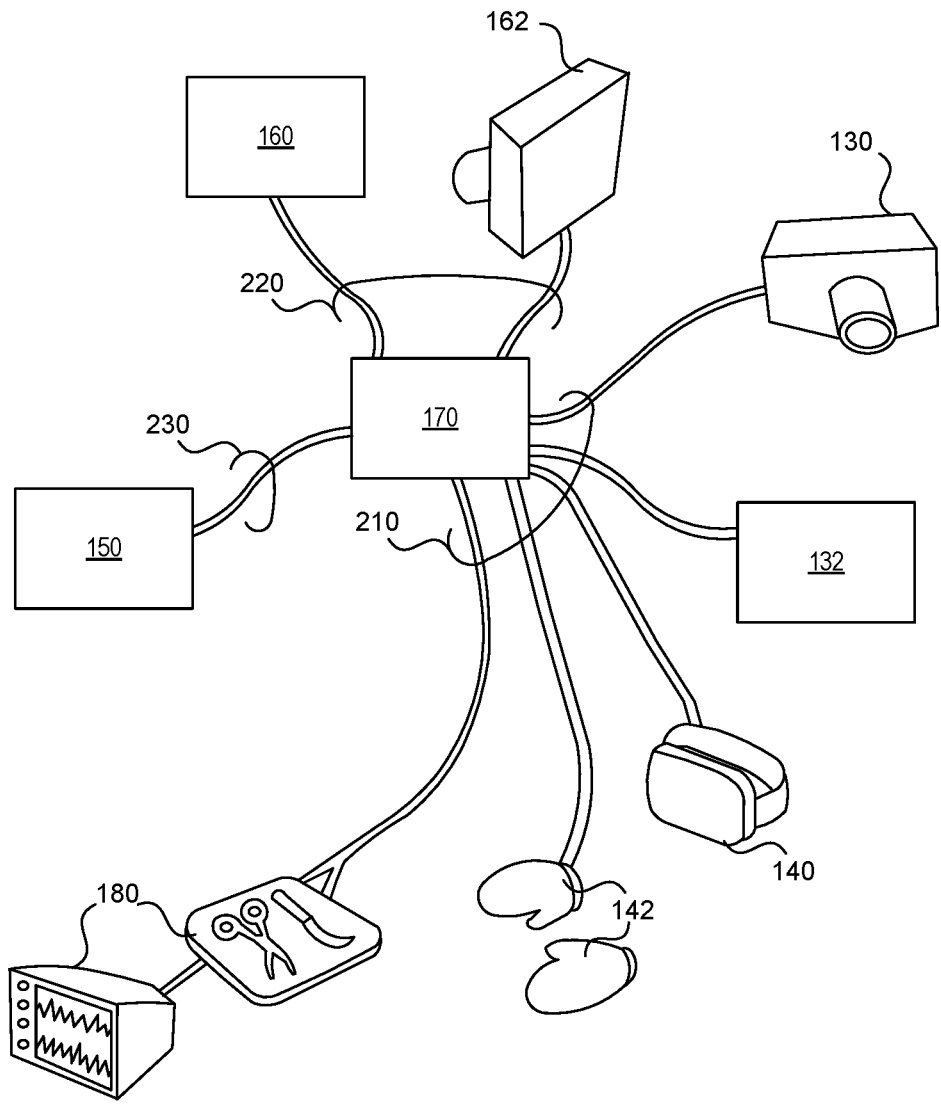
FIG. 2 illustrates how different components of the system may be interconnected via communication channels.

FIG. 2 illustrates how different components of the system 100 may be interconnected via communication channels. Here, for example, the scenario generation mechanism 170 is connected to a series of peripherals (e.g., the simulation mechanism 132 connected to the image projection mechanism 130, the headpiece 140, the hand covering(s) 142, and the piece(s) of medical equipment 180) via corresponding communication channels 210 (also referred to as "activating connections"). Moreover, the scenario generation mechanism 170 is connected to the performance review mechanism 160 and/or the recording device 162 via corresponding communication channels 220 (also referred to as "reporting connections"). Accordingly, data generated by a peripheral (e.g., the hand covering(s) 142) may be transmitted to the scenario generation mechanism 170 via an activating connection, and then forwarded by the scenario generation 170 to a reporting connection for transmission to a destination (e.g., the performance review mechanism 160). In some embodiments, a communication channel 230 (also referred to as a "console connection") is interconnected between the controller 150 and the performance review mechanism 160, the simulation mechanism 132, the recording device 160, or the image projection mechanism 130. Each of the activating connections 210, reporting connections 220, and console connections 230 may be a wired channel or a wireless channel. In some embodiments, the system 100 may connect more than one learner 110 simultaneously through additional connections as for the single learner, allowing the multiple learners to interact as above with the elements of the system 100, including the performance review mechanism 160.

Generally, the scenario generation mechanism 170 is controlled by data exchanged with the controller 150 (also referred to as a "control console"), which may work through the console connection 230 to control the simulation mechanism 132, the headpiece 140, the hand covering(s) 142, etc. The controller 150 may be embodied in hardware, software, or any combination thereof. For example, in some embodiments the controller 150 resides on an electronic device (e.g., a mobile phone) in the form of a computer program (e.g., a mobile application).

During a simulation session, various types of information can be collected in real time. For example, data may be collected from the headpiece 140, the hand covering(s) 142, the recording device 162, or any combination thereof. Thus, data may be collected from a single source or multiple sources. Data could be collected from multiple sources either sequentially or simultaneously.

Figure 3:
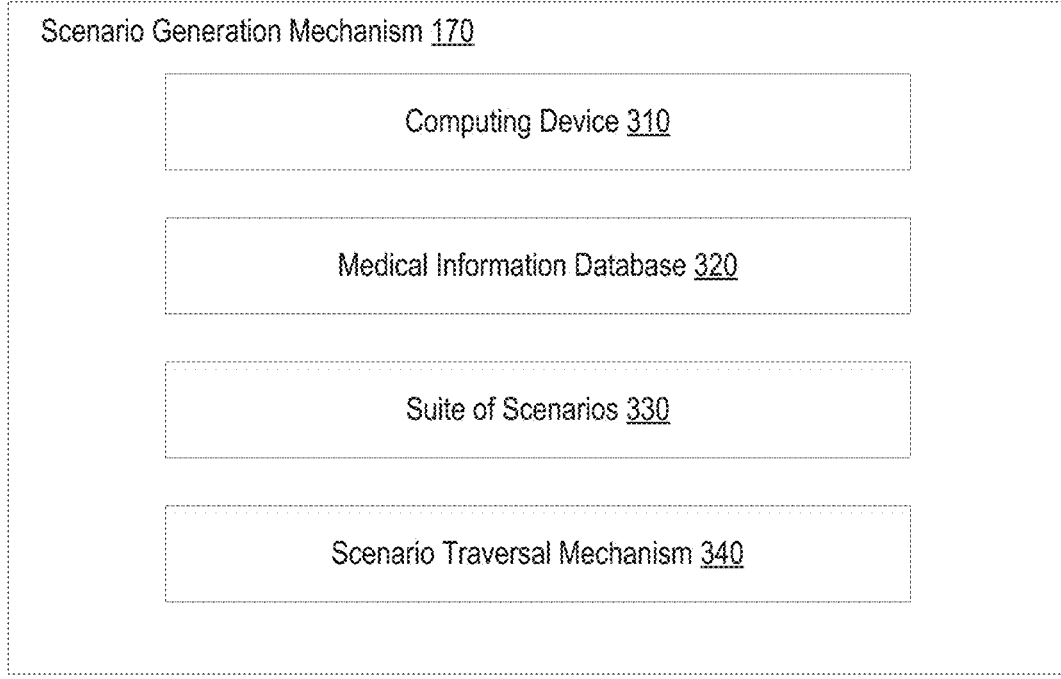
FIG. 3 depicts an example of scenario generation mechanism that includes a computing device, a medical information database, a suite of scenarios, and a scenario traversal mechanism (also referred to as a "state engine").

FIG. 3 depicts an example of scenario generation mechanism 170 that includes a computing device 310, a medical information database 320, a suite of scenarios 330, and a scenario traversal mechanism 340 (also referred to as a "state engine"). In some embodiments, the medical information database 320, the suite of scenarios 330, and the state engine 340 reside on the computing device 310. For example, the medical information database 320 and the suite of scenarios 330 may reside in the memory of the computing device 310. In other embodiments, the medical information database 320, the suite of scenarios 330, and the state engine 340 are accessible to the computing device 310 across a network. For example, the medical information database 320 or the suite of scenarios 330 may reside on a network-accessible server system that is accessible to the computing device 310 across a network. In such embodiments, the scenario generation mechanism 170 may be able to download information from the network-accessible server system and/or upload information to the network-accessible server system. The network-accessible server system may be comprised of one or more computer servers.

The computing device 310 can acquire monitoring data (or simply "data") generated by the peripherals during a simulation session. For example, the computing device 310 may acquire data from the headpiece 140, the hand covering(s) 142, the piece(s) of medical equipment 180, or any combination thereof. In some embodiments the data is transmitted from the peripherals to the computing device 310 in real time (i.e., during the simulation session), while in other embodiments the data is transmitted from the peripherals to the computing device 310 following the conclusion of the simulation session, the occurrence of a certain event, or the expiration of a predetermined time interval. For instance, data may be transmitted on a periodic basis (e.g., daily, weekly, or monthly). Moreover, the computing device 310 can deliver the data to the state engine 340. The computing device 310 may manipulate, reformat, or filter the data before delivering it to the state engine 340.

The computing device 310 may control the state engine 340 based on information stored in, or derived from, the medical information database 320 and/or the suite of scenarios 330. Additionally or alternatively, the computing device 310 may control the state engine 340 based on data generated by the headpiece 140, the hand covering(s) 142, or the piece(s) of medical equipment 180. For example, if a scenario includes multiple possible routes, the state engine 340 may determine which route to take based on these inputs. Each route may correspond to a unique learning experience for the learner 110. For instance, a scenario designed to test awareness of cardiac protocols may include a first route in which heart rate decreases by a predetermined amount, a second route in which the decrease in heart rate is accompanied by a decrease in blood pressure, etc. The suite of scenarios 330 can be derived from standard medical protocols, such as Advanced Adult Cardiac Life Support (AACLS) and others described earlier. An example in the AACLS is the Adult Cardiac Arrest Algorithm which, in some editions, prescribes the choice between using shock from a defibrillator and using cardiopulmonary resuscitation (CPR) based on biometrics from the patient. The scenario in the suite of scenarios would allow for the same choice by presenting biometrics, apparently from the manikin, to the learner. The learner should make the proper choice to use a defibrillator or CPR. Generally, each scenario in the suite of scenarios 330 is dynamic in nature. Thus, the state engine 340 may autonomously traverse different paths within a scenario based on the actions of the learner(s) involved in the scenario. For instance, if a learner performs one or more appropriate actions, then the health state of the manikin may get better. Similarly, if the learner performs one or more inappropriate actions, then the health state of the action may get worse.

Figure 4:
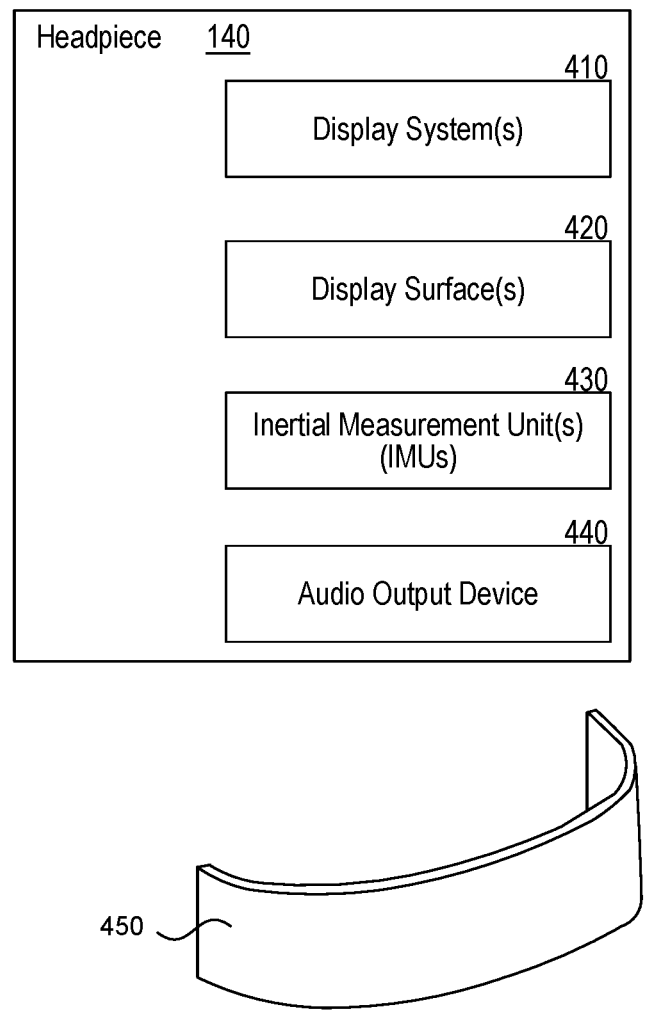
FIG. 4 depicts an example of a headpiece that includes one or more display systems, one or more display surfaces, one or more inertial measurement units (IMUs), an audio output device, and a head-mounting apparatus.

FIG. 4 depicts an example of a headpiece 140 that includes one or more display systems 410, one or more display surfaces 420, one or more IMUs 430, an audio output device 440, and a head-mounting apparatus 450. Generally, the headpiece 140 includes at least one display system 410 and at least one display surface 420. In some embodiments, the headpiece 140 includes separate display surfaces for the learner's left and right eyes. In other embodiments, the headpiece 140 includes a single display surface that can be concurrently viewed by both eyes. The display surface(s) 420 may be curved in order to enlarge the viewing field, thereby improving the experience of the learner 110. In some embodiments, the display surface(s) 420 are at least semi-transparent to allow the learner 110 to simultaneously view digital content (e.g., augmented reality features) and the real world.

The display surface(s) 420 may complexly surround one or both eyes of the learner 110. As described above, the headpiece 140 can include a pair of display surfaces. In such embodiments, the right eye may be shown a first representation of a digital feature on a first display surface and the left eye may be shown a second representation of the digital feature on a second display surface. These separate display surfaces may be optimized to concurrently present digital features, such as an overlay on the manikin 120. In other embodiments, the headpiece 140 includes a single display surface, some portion of which is viewable by both eyes and some portion of which is viewable by a single eye.

The display system(s) 410 can be arranged in several different orientations. For example, a pair of display systems could be oriented toward (or set within/behind) a corresponding pair of display surfaces. In some embodiments, a first display system is configured to project light toward a first display surface or into the left eye, while a second display system is configured to project light toward a second display surface or into the right eye. The display systems may project the same digital image, similar digital images, or different digital images. The placement of the display system(s) 410 may relate to the placement of the display surface(s) 420. Moreover, the placement of the display system(s) 410 may depend on properties of the digital content to be projected by the display system(s) 410. Examples of such properties include the pixel count, resolution, brightness, etc.

Data generated by the IMU(s) 430 may be used the determine orientation, position, or movement of the head, which in turn may be used to derive a focal point of the learner 110. As described above, an IMU is an electronic component designed to measure the force, angular rate, inclination/tilt, and/or magnetic field of an object. For example, changes in acceleration (e.g., as measured by an accelerometer) may be indicative of movement by the learner 110 throughout the ambient environment, and higher accelerations may be representative of more urgent movements.

The head-mounting apparatus 450 enables the headpiece 140 to be secured to the learner's head. Generally, when the headpiece 140 is secured to the learner's head, the display system 410 is arranged such that its output is directed toward the display surface(s) 420 or the learner's eye(s). Similarly, the audio output device 440 can be arranged such that its output is directed toward the learner's ear(s). The audio output device 440 may be, for example, a directional speaker designed to broadcast audio across a narrow region of space or an omnidirectional speaker designed to broadcast audio across a broad region of space.

Embodiments of the headpiece 140 may include some or all of the components shown here, as well as other components not shown here. For example, the display system 410 could be arranged such that its output is directed toward the learner's eye(s). In such embodiments, the display surface(s) 420 may not be necessary. As another example, if audio output devices (e.g., speakers) are arranged throughout the ambient environment in which the simulation session occurs, then the audio output device 440 may not be necessary.

Figure 5:
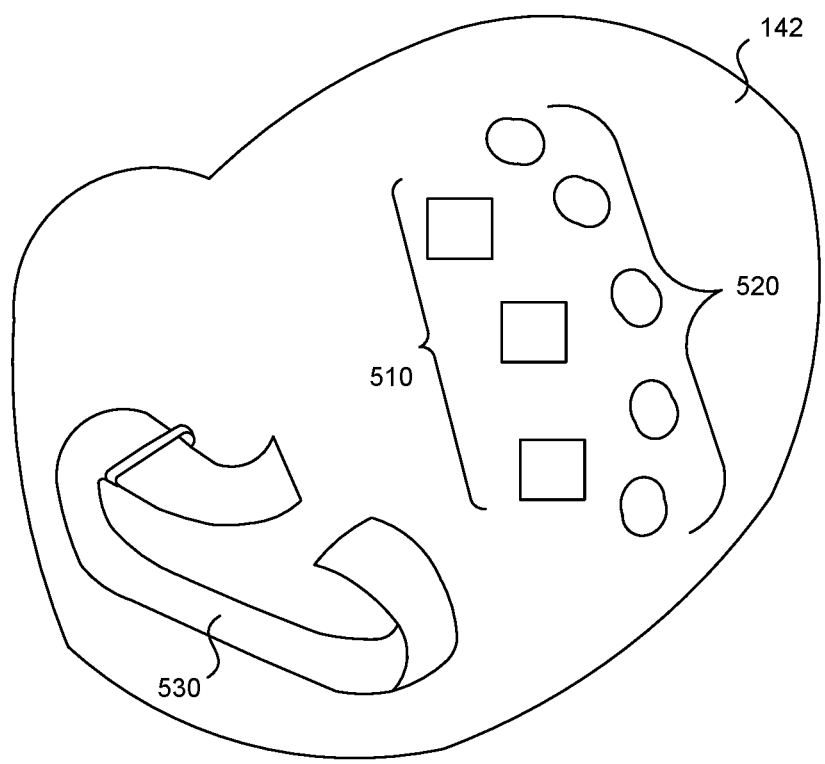
FIG. 5 depicts an example of a hand covering that can include a hand-mounting apparatus, one or more actuators, and/or one or more touch sensors.

FIG. 5 depicts an example of a hand covering 142 that includes one or more actuators 510, one or more touch sensors 520, and a hand-mounting apparatus 530. Those skilled in the art will recognize that hand coverings need not necessarily include all of these components. For example, depending on the simulation session, a hand covering may not include actuator(s) 510 and/or touch sensor(s) 520.

Together, the actuator(s) 510 may be responsible for controlling different aspects of the hand covering 142. For example, the hand covering 142 may include a series of actuators, each of which is responsible for managing the movement of a different finger covering. Generally, the actuator(s) 510 control the hand covering 142 in a collaborative manner to emulate movement of the hand. In an example, actuator(s) may be located in a tip of at least one finger of the hand covering 142. In such embodiments, when the hand covering 142 detects that it is touching the surface of the manikin 120 at the proper location to detect a pulse, the actuator(s) may create the sensation of a detected pulse on the fingertip of the learner by alternately energizing and deenergizing the actuators with a periodicity and intensity to simulate a pulse. In another example, thermal actuator(s) may be located in at least one finger of the hand covering 142. In such embodiments, when the hand covering 142 detects that it is touching the surface of the manikin, the thermal actuator(s) may respond to biometric readings which indicate an elevated skin temperature by elevating the temperature of the finger(s) (or the entire hand covering 142) so that the learner 110 experiences the elevated temperature and can react by making choices within the simulated scenario.

The touch sensor(s) 520, meanwhile, can be arranged to detect touch events performed by the hand residing within the hand covering 142. For example, when the hand touches an object (e.g., a piece of medical equipment 180 or a segment of the manikin 120), the touch sensor(s) 520 can record an occurrence of a touch event. By examining the touch events performed over the course of a simulation session, greater visibility can be gained into how the learner 110 can improve. As shown in FIG. 5, the hand covering 142 could include a series of touch sensors 520 arranged to detect touch events performed by different segments of the hand (e.g., each touch sensor may correspond to a single finger).

The hand-mounting apparatus 530 enables the hand covering 142 to be secured on or near the learner's hand. For example, the hand-mounting apparatus 530 may take the form of a band designed to be secured around the wrist. As another example, the hand-mounting apparatus 530 may take the form of a glove designed to be worn on the hand.

In some embodiments the learner 110 wears a single hand covering 142 on either the left hand or the right hand, while in other embodiments the learner 110 wears a pair of hand coverings 142 on both hands. Hand coverings designed for left hands may include different components than hand coverings designed for right hands. In an example, both the left- and right-hand coverings may be controlled by an embedded controller residing within either the left- or right-hand covering. According, in some embodiments, only one of the hand coverings contains the hardware and/or software needed to control both hand coverings.

Embodiments of the hand covering 142 may include some or all of the components shown here, as well as other components not shown here. For example, the hand covering 142 could include a recording device designed to generate audio media, video media, or any combination thereof. In an embodiment where the recording device is designed to generate video media, the recording device may be oriented toward the fingers such that action(s) performed by the learner 110 can be observed, analyzed, etc. As another example, the hand covering 142 could include one or more IMUs whose output(s) can be examined to detect movement, orientation, etc. In an example, a particular position and/or orientation of the fingertips of the hand coverings 142 is required to simulate that the learner 110 has successfully pressed against the skin of the manikin 120 to detect a pulse.

Figure 6:
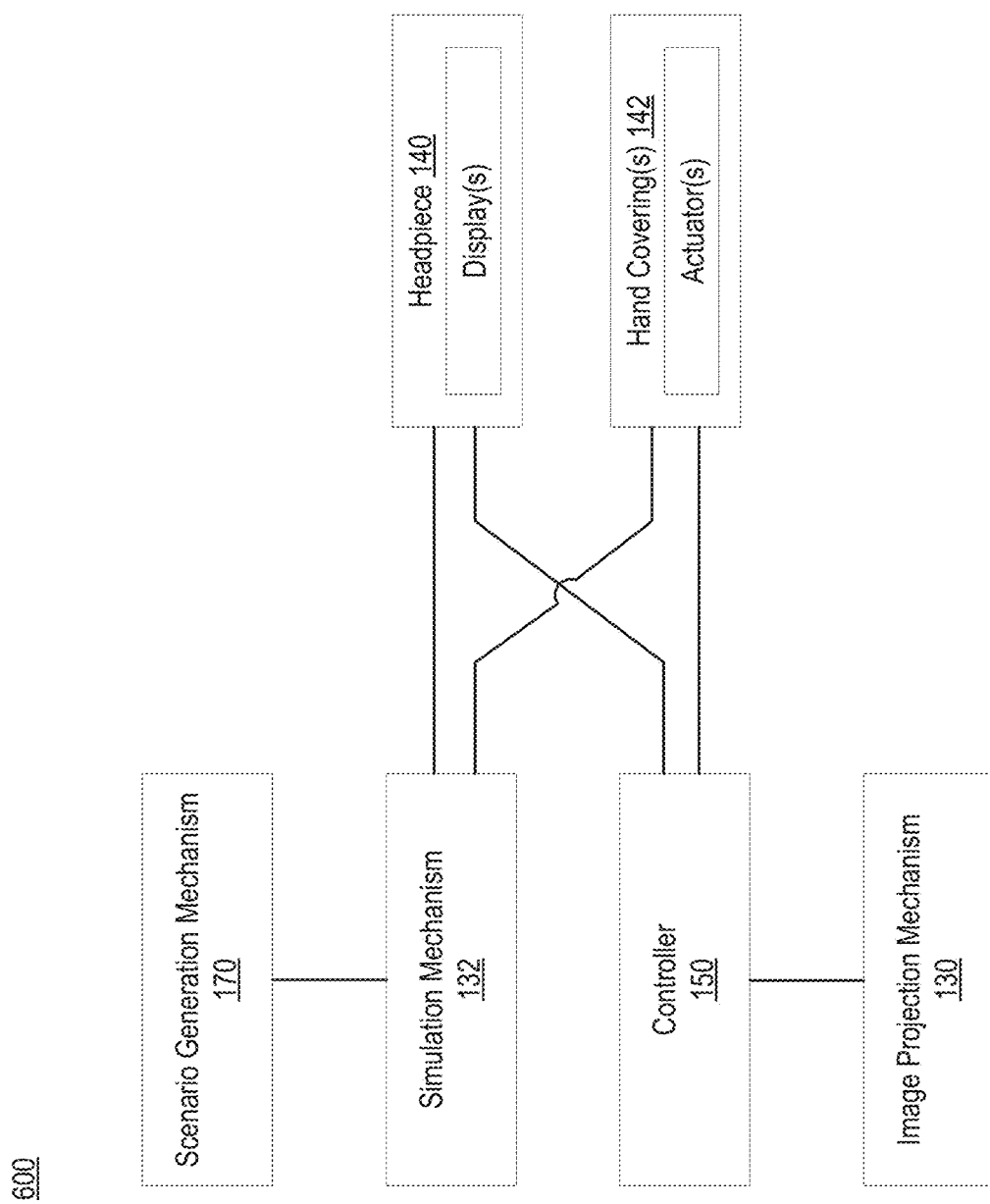
FIG. 6 depicts an example of a network environment that includes a scenario generation mechanism configured to direct the simulation mechanism to manipulate the display(s) in the headpiece worn by the learner and/or the actuator(s) in each hand covering worn by learner.

FIG. 6 depicts an example of a network environment 600 that includes a scenario generation mechanism 170 configured to direct the simulation mechanism 132 to manipulate the display(s) in the headpiece 140 worn by the learner 110 and/or the actuator(s) in each hand covering 142 worn by learner 110. Thus, the headpiece 140 and the hand covering(s) 142 can work in concert to inform the learner 110 of different details regarding the simulation session.

As shown in FIGS. 1-2, the scenario generation mechanism 170 may communicate with different components via activating connection(s) 210, reporting connection(s) 220, and console connection(s) 230. In some embodiments, these connections facilitate communications via wired channels. For example, a physical cable may be connected between the headpiece 140 and the simulation mechanism 132. In such embodiments, however, the wired channels may limit the ability of the learner 110 to traverse the ambient environment. In other embodiments, these connections facilitate communications via wireless channels. For example, the headpiece 140 and the simulation mechanism 132 may each include a wireless communication module capable of transmitting/receiving information across a network. Similarly, the hand covering(s) 142 and the simulation mechanism 132 may each include a wireless communication module capable of transmitting/receiving information across a network. The network could be a personal area network (PAN), local area network (LAN), wide area network (WAN), metropolitan area network (MAN), cellular network, the Internet, etc. Additionally or alternatively, these components may communicate with one another over a short-range communication protocol, such as Bluetooth® or Near Field Communication (NFC).

During a simulation session, the controller 150 can send information to the image projection mechanism 130, which may project digital content onto the surface of the manikin 120. The digital content may include details of the human body that the manikin 120 is presently emulating. For example, the image projection mechanism 130 may cause the manikin 120 to appear clothed or unclothed. As another example, the image projection mechanism 130 may cause a portion of the manikin to appear discolored (e.g., from bruising, burning, etc.). The controller 150 may also send information to the headpiece 140 and/or the hand covering(s) 142 to simulate a biometric condition of the human body that the manikin 120 is presently emulating. Examples of biometric conditions that may be simulated include heart rate, blood pressure, body temperature, perspiration, etc.

Some simulation sessions may require that piece(s) of medical equipment 180 be used by the learner 110. The piece(s) of medical equipment 180 may be associated with the medical scenario represented in the simulation session. For example, the piece(s) of medical equipment 180 may correspond to those typically used in accordance with standardized protocols, such as defibrillators, cardiopulmonary monitors, small instruments, etc. In some embodiments, individual pieces of medical equipment may need to be instrumented so that the use of such pieces by the learner 110 during the simulation session can be detected.

Figure 7:
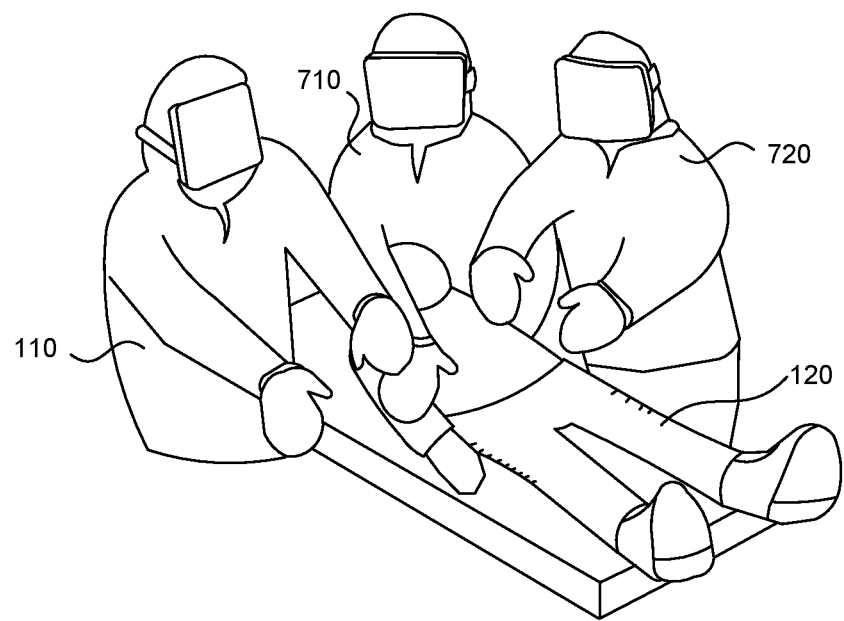
FIG. 7 illustrates an example scenario in which a learner (also referred to as a "first participant") is accompanied by a second participant and a third participant.

Some simulation sessions may be designed for multiple participants. FIG. 7 illustrates an example scenario in which a learner 110 (also referred to as a "first participant") is accompanied by a second participant 710 and a third participant 720. Together, the first, second, and third participants 110, 710, 720 can take part in a learning experience. Each participant may be given a headpiece and/or one or more hand coverings.

In some embodiments, each participant is considered an active participant (also referred to as an "active learner"). In such embodiments, the participants may concurrently participant in the same simulation session (e.g., as part of a team) or in different simulation sessions. In other embodiments, at least one of the participants is not an active participant, but instead acts as a passive participant that supplements the simulated elements of the simulation session. For example, a participant may represent a friend or a family member of the person represented by the manikin 120. As another example, a participant may represent a medical professional (e.g., a physician or a nurse) whose presence is required to realistically simulate a medical situation. While FIG. 7 depicts a scenario involving three active participants, those skilled in the art will recognize that any number of active participants and passive participants may be involved in a simulation session.

When one or more active participants are present, each of whom may be equipped with a headpiece 140 and/or hand covering(s) 142, a medical scenario can be enacted through a simulation session. The medical scenario is typically designed with the intention that it guide the active participant(s) toward specific responses. These responses can include anticipating or reacting to medical events along a timeline. Generally, the goal of the simulation session is to provoke responses which can be then be examined and compared to those specified by the appropriate medical standards, protocols, etc. Subsequent analysis of the responses may surface whether the active participant(s) took the appropriate steps as required by the appropriate medical standards, protocols, etc.

A controller (e.g., controller 150) may be used to direct a teaching system (e.g., system 100) to follow a unique scenario rather than a predetermined scenario for each successive simulation session, thereby eliciting from the active participant(s) responses to medical situations that cannot be readily anticipated beforehand. The real-time nature of the simulation session may cause each active participant to experience stress, thereby mimicking the stresses that would be experienced in a comparable medical situation occurring in the real world. Thus, the responses of each active participant involved in a simulation session can enforce their ability to respond in accordance with the appropriate medical standard(s) when experiencing a real-world medical situation.

A scenario generation mechanism (e.g., scenario generation mechanism 170) may direct each passive participant involved in a simulation session. For example, the scenario generation mechanism may prompt the passive participant(s) to perform an action, such as interfering with the motion of an active participant, introducing a mistake in a medical procedure, providing additional information regarding the person represented by the manikin, dropping a piece of medical equipment on the floor, etc. In such situations, the teaching system can monitor each passive participant to determine whether each action is performed as required by the prompt. The teaching system can alter the simulation session based on whether the action(s) were (or were not) performed by the passive participant(s). For example, if the participants' actions, either individually or collectively, deviate from the scope of a simulation session, the teaching system may suspend, stop, or reset the simulation session. As another example, the teaching system may dynamically alter the course of the simulation session based on the participants' actions or lack thereof. Consequently, the simulation session can continue in a realistic manner regardless of the responses of each passive participant. The complications introduced by the passive participant(s) may be part of the simulation session created/traversed by the scenario generation mechanism 170. Moreover, the complications may stress the active participant(s) involved in a simulation session in ways that digital content (e.g., augmented reality features and virtual reality features) cannot.

FIG. 8 depicts a flow diagram of a process 800 for monitoring whether an active participant in a simulation session has acted in accordance with the appropriate medical protocol(s). Initially, a scenario generation mechanism (e.g., scenario generation mechanism 170 of FIG. 1) can receive input indicative of a selection of a medical situation (step 801). In some embodiments, the selection is manually made by an individual (e.g., a supervisor of the simulation session). In other embodiments, the selection is automatically made by the scenario generation mechanism. For example, the scenario generation mechanism may select the medical situation based on a characteristic of an active participant who will be involved in the simulation session. Examples of participant characteristics include job title (e.g., whether the active participant is a physician, nurse, etc.), specialty area (e.g., cardiology, oncology, etc.), experience (e.g., as measured by the number of years of medical school that have been completed), etc. As another example, the scenario generation mechanism may select the medical situation based on a characteristic of the person represented by a manikin involved in the simulation session. Examples of manikin characteristics include age, gender, weight, medication condition (e.g., disease, ailment, etc.), etc.

The scenario generation mechanism can then identify a simulation session corresponding to the medical situation (step 802). For example, the scenario generation mechanism may access a database of simulation sessions, compare a feature of the medical situation to a corresponding feature of each simulation session, and then choose a matching simulation session. A simulation session may "match" a medical situation if shares at least one feature in common with the medical situation. For example, if the input specifies the manikin should emulate a young female with diabetes, then the scenario generation mechanism may examine the database of simulation sessions to discover those satisfying these requirements.

Thereafter, the scenario generation mechanism can facilitate the simulation session (step 803). More specifically, the scenario generation mechanism may transmit instructions representation of the simulation session to a controller (e.g., controller 150 of FIG. 1), which can control an image projection mechanism (e.g., image projection mechanism 130 of FIG. 1) based on the instructions. For example, the image projection mechanism may project a visual pattern onto the surface of the manikin involved in the simulation session. In some embodiments, the scenario generation mechanism also causes the active participant to be monitored throughout the simulation session. For example, a recording device (e.g., recording device 162 of FIG. 1) may generate audio media and/or video media throughout the simulation session. Additionally or alternatively, IMUs connected to a headpiece (e.g., headpiece 140 of FIG. 1) and/or hand covering(s) (e.g., hand covering(s) 142 of FIG. 1) may generate data from which the active participant's action(s) can be derived. Additionally or alternatively, a recording device (e.g., recording device 162 of FIG. 1) may be configured to employ speech recognition algorithm(s) and/or other technologies to provide data based on an audio recording generated by the recording device to the scenario generation mechanism. The scenario generation mechanism may adapt the simulation session based on the actions of the participants, as recognized through the audio recording. For example, a participant may audibly request a dosage of a particular drug be administered to the manikin as the participant attempts to follow the protocol. The scenario generation machine may modify the biometrics of the manikin according to the administration of such a drug dosage.

After the simulation session has been completed, a performance review mechanism (e.g., performance review mechanism 160 of FIG. 1) can review data indicative of the action(s) of the active participant during the simulation session (step 804). The data may be acquired from the recording device, headpiece, hand covering(s), piece(s) of medical equipment, etc. In some embodiments, the performance review mechanism generates a report that specifies whether the active participant acted in accordance with the appropriate medical protocol(s) (step 805). Such a determination can be made by comparing the action(s) of the active participant to those that are required by the appropriate medical protocol(s). Some embodiments of the report specify whether the active participant was in full compliance (e.g., the report may specify whether the active participant either passed or failed), while other embodiments of the report specify the aspect(s) in which full compliance was not achieved.

Unless contrary to physical possibility, it is envisioned that the steps described above may be performed in various sequences and combinations. For example, the performance review mechanism could be configured to review the performance of the active participant in real time (i.e., as the simulation session is completed). In such embodiments, the simulation session may be modified to test the aspect(s) of the medical protocol(s) in which full compliance was not achieved. For example, if the performance review mechanism discovers that the active participant did not properly apply a defibrillator to the manikin, the scenario generation mechanism may cause the person represented by the manikin to experience another cardiac event which requires another application of the defibrillator.

Other steps may also be included in some embodiments. For example, the performance review mechanism could surface a recommendation that prompts the supervisor to take additional action, surface a notification (e.g., in the form of an email, text message, automated phone call, etc.) that summarizes the results of the simulation session, etc.

Processing System

Figure 9:
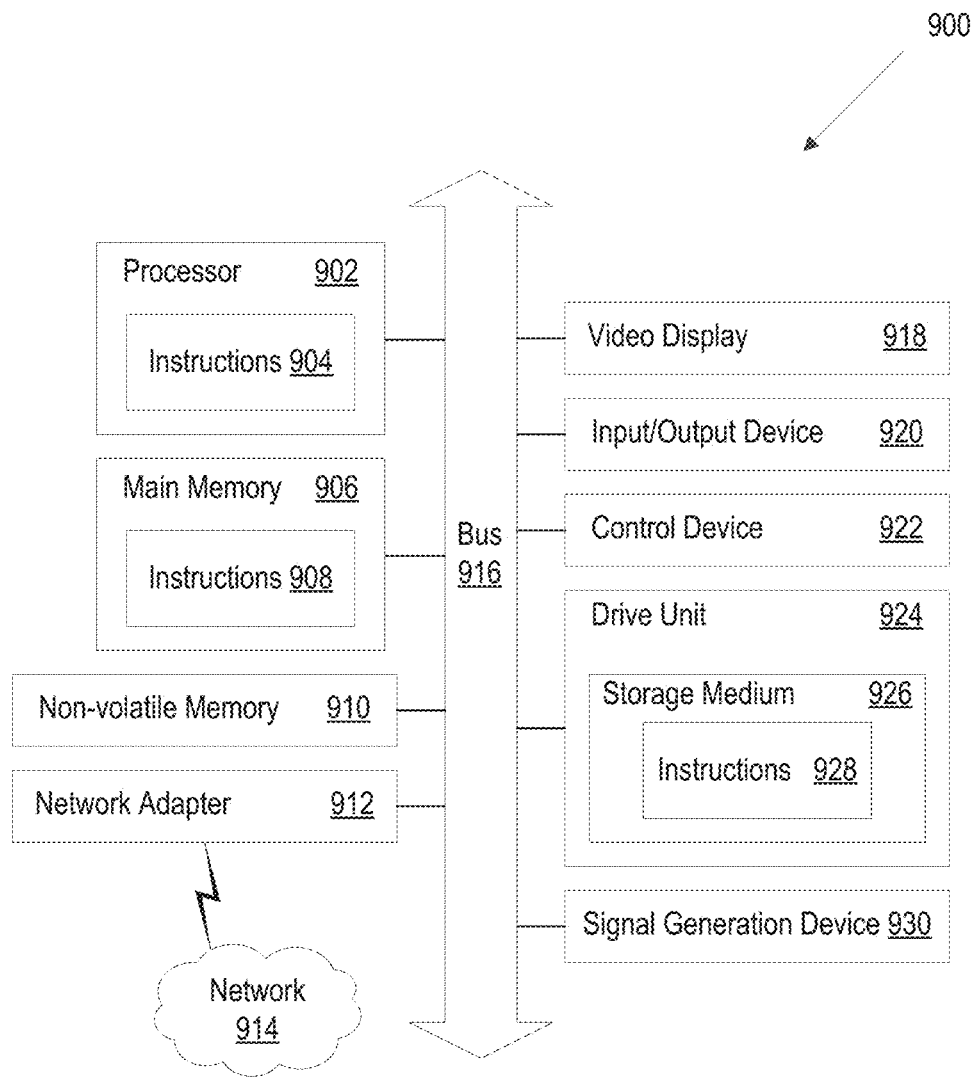
FIG. 9 is a block diagram illustrating an example of a processing system in which at least some operations described herein can be implemented.

FIG. 9 is a block diagram illustrating an example of a processing system 900 in which at least some operations described herein can be implemented. For example, some components of the processing system 900 may be hosted across any combination of components of a system (e.g., system 100 of FIG. 1) designed to facilitate simulation sessions. As another example, some components of the processing system 900 may be hosted on an electronic device (e.g., a computer server) connected to the system across a network.

The processing system 900 may include one or more central processing units ("processors") 902, main memory 906, non-volatile memory 910, network adapter 912 (e.g., network interface), video display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C)

bus, or an Institute of Electrical and Electronics Engineers (IEEE) standard 1394 bus (also referred to as "Firewire").

The processing system 900 may share a similar computer processor architecture as that of a desktop computer, tablet computer, personal digital assistant (PDA), mobile phone, game console, music player, wearable electronic device (e.g., a watch or a fitness tracker), network-connected ("smart") device (e.g., a television or a home assistant device), virtual/augmented reality systems (e.g., a head-mounted display), or another electronic device capable of executing a set of instructions (sequential or otherwise) that specify action(s) to be taken by the processing system 900.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the processing system 900.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in a computing device. When read and executed by the one or more processors 902, the instruction(s) cause the processing system 900 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 910, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 912 enables the processing system 900 to mediate data in a network 914 with an entity that is external to the processing system 900 through any communication protocol supported by the processing system 900 and the external entity. The network adapter 912 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 may include a firewall that governs and/or manages permission to access/proxy data in a computer network. The firewall may also track varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A system for facilitating a simulation session representative of a fictional scenario in which an individual is prompted to address a medical situation, the system comprising:
   a manikin that is representative of a patient;
   a scenario generation mechanism configured to:
   receive input indicative of a selection of a medical situation, examine a suite of simulation sessions to identify a simulation session corresponding to the medical situation, and execute a script corresponding to the simulation session;

an image projection mechanism configured to cause display of a digital feature proximate to the manikin during the simulation session;

a hand covering that includes:
multiple structural elements,
multiple actuators configured to emulate natural movement by collaboratively controlling the multiple structural elements,
a touch sensor configured to generate touch data indicative of touch events performed by a hand to which the hand covering is secured, and
an inertial measurement unit configured to generate movement data indicative of a force, an inclination, an angular rate, or a magnetic field experienced by the hand covering;

a controller configured to:
acquire the touch data and the movement data from the hand covering,
examine the touch data, the movement data, or any combination thereof to detect an occurrence of an action performed by the individual,
create a record of the action, and
store the record in a session profile that includes a log of actions performed by the individual during the simulation session.

2. The system of claim 1, wherein the script is a multi-path script capable of being dynamically traversed by the scenario generation mechanism in real time based on behavior of the individual during the simulation session.

3. The system of claim 1, further comprising:
a performance review mechanism configured to:
examine the log of actions performed by the individual during the simulation session,
compare the log of actions to a protocol associated with the medical situation,
determine a compliance level based on an outcome of said comparing, and
cause display of a notification that specifies the compliance level.

4. The system of claim 3, wherein the notification is accessible to another individual responsible for managing the simulation session.

5. The system of claim 1, wherein the digital feature is representative of a wound or a discoloration.

6. The system of claim 1, further comprising:
a headpiece that includes:
a display system configured to display a second digital feature that is visible to at least one eye of the individual, and
an inertial measurement unit configured to generate second movement data indicative of a force, an inclination, an angular rate, or a magnetic field experienced by the headpiece.

7. The system of claim 6, wherein the digital feature displayed by the image projection mechanism and the second digital feature displayed by the headpiece are related to one another.

8. The system of claim 1, further comprising:
a recording device configured to record an ambient environment in which the individual completes the simulation session.

9. The system of claim 8, wherein the recording device is configured to generate audio media, video media, or any combination thereof.

10. A method comprising:
receiving input indicative of a selection of a medical situation;
examining a suite of simulation sessions to identify a simulation session corresponding to the medical situation,
wherein the simulation session requires that a participant address a fictional scenario by interacting with a manikin representative of a patient;
facilitating the simulation session by executing a corresponding script;
acquiring data indicative of what actions, if any, were performed by the participant during the simulation session;
comparing the actions to a protocol associated with the medical situation;
estimating, based on said comparing, a level of compliance with the protocol; and
transmitting a notification to an electronic device,
wherein the notification specifies the level of compliance exhibited by the participant.

11. The method of claim 10, wherein the electronic device is associated with the participant.

12. The method of claim 10, wherein the electronic device is associated with an individual responsible for managing the simulation session.

13. The method of claim 10, further comprising:
receiving input indicative of a specification of a characteristic of the participant; and
selecting the medical situation based on the characteristic.

14. The method of claim 13, wherein the characteristic is a job title, a specialty area, an experience level, or any combination thereof.

15. The method of claim 10, further comprising:
receiving input indicative of a specification of a characteristic of the patient; and
selecting the medical situation based on the characteristic.

16. The method of claim 15, wherein the characteristic is an age, a gender, a weight, a medical condition, or any combination thereof.

17. A system comprising:
a manikin that is representative of a patient;
a scenario generation mechanism configured to:
receive input indicative of a selection of a medical situation,
examine a suite of simulation sessions to identify a simulation session corresponding to the medical situation, and
execute a script corresponding to the simulation session;
a recording device configured to record an ambient environment in which an individual completes the simulation session, thereby creating media content;
a controller configured to:
acquire the media content from the recording device,
examine the media content to detect an occurrence of an action performed by the individual,
create a record of the action, and
store the record in a session profile that includes a log of actions performed by the individual during the simulation session.

18. The system of claim 17, further comprising:
an image projection mechanism configured to cause display of a digital feature proximate to the manikin during the simulation session.

19. The system of claim 17, wherein the recording device is configured to generate audio media, video media, or any combination thereof.

20. The system of claim 17, further comprising:
a hand covering that includes:
multiple structural elements,
multiple actuators configured to emulate natural movement by collaboratively controlling the multiple structural elements,
a touch sensor configured to generate touch data indicative of touch events performed by a hand to which the hand covering is secured.

21. The system of claim 20, wherein the recording device is further configured to monitoring a location of the hand covering based on a presence of an identifier associated with the hand covering.

22. The system of claim 20, wherein the identifier is a visual identifier that is visually identifiable along an exterior surface of the hand covering.

23. The system of claim 20, wherein the identifier is an electronic identifier that is emitted by a source that resides within the hand covering.

* * * * *